: US009042018B2

(12) United States Patent
Magnusson et al.

(10) Patent No.: US 9,042,018 B2
(45) Date of Patent: May 26, 2015

(54) LEAKY-MODE RESONANT RETARDERS AND RELATED METHODS

(75) Inventors: Robert Magnusson, Arlington, TX (US); Mehrdad Shokooh-Saremi, Plano, TX (US)

(73) Assignee: The Board of Regents of The University of Texas System, Austin, TX (US)

( * ) Notice: Subject to any disclaimer, the term of this patent is extended or adjusted under 35 U.S.C. 154(b) by 98 days.

(21) Appl. No.: 13/116,990

(22) Filed: May 26, 2011

(65) Prior Publication Data

US 2011/0292504 A1  Dec. 1, 2011

Related U.S. Application Data

(60) Provisional application No. 61/348,289, filed on May 26, 2010.

(51) Int. Cl.
    *G02B 5/30* (2006.01)
    *G02B 27/28* (2006.01)
    *G02B 26/08* (2006.01)
    *G02F 1/29* (2006.01)

(52) U.S. Cl.
    CPC .................................... *G02B 5/3083* (2013.01)

(58) Field of Classification Search
    USPC ........... 359/485.01–489.1, 34, 290–292, 298, 359/332
    See application file for complete search history.

(56) References Cited

U.S. PATENT DOCUMENTS

| 7,689,086 B2 * | 3/2010 | Magnusson et al. .......... 385/129 |
| 2002/0171794 A1 * | 11/2002 | Nakamura et al. ............ 349/117 |
| 2007/0285601 A1 * | 12/2007 | Hendrix et al. ............... 349/117 |

OTHER PUBLICATIONS

Avrutsky and Sychugov, "Reflection of a beam of finite size from a corrugated waveguide," *J. Mod. Opt.*, 36:1527-1539, 1989.
Brundrett et al., "Normal-incidence guided-mode resonant grating filters : design and experimental demonstration," *Opt. Lett.*, 23:700-702, 1998.
Ding and Magnusson, "Resonant leaky-mode spectral-band engineering and device applications," *Opt. Express*, 12:5661-5674, 2004.
Ding and Magnusson, "Use of nondegenerate resonant leaky modes to fashion diverse optical spectra," *Opt. Express*, 12:1885-1891, 2004.
Eberhart and Kennedy, "Particle swarm optimization," in *Proceedings of IEEE Conference on Neural Networks*, 1942-1948, 1995.
Gale et al., "Zero-order diffractive microstructures for security applications," *Proc. SPIE on Optical Security and Anticounterfeiting Systems*, 1210:83-89, 1990.
Golubenko et al., "Total reflection of light from a corrugated surface of a dielectric waveguide," *Sov. J. Quantum Electron.*, 15:886-887, 1985.

(Continued)

*Primary Examiner* — Scott J Sugarman
*Assistant Examiner* — Brandi Thomas
(74) *Attorney, Agent, or Firm* — Norton Rose Fulbright US LLP

(57) ABSTRACT

A leaky-mode resonant retarder is described. The retarder may include a substrate and a spatially modulated periodic layer coupled to the substrate, where the spatially modulated periodic layer is configured to shift a phase between two perpendicular electric-field components of incident light. The retarder may operate as a half-wave plate or a quarter-wave plate.

11 Claims, 16 Drawing Sheets

(56) References Cited

OTHER PUBLICATIONS

Jacob et al., "Normally incident resonant grating reflection filters for efficient narrow-band spectral filtering of finite beams," *J. Opt. Soc. Am. A*, 18:2109-2120, 2001.
Kennedy and R. Eberhart, "Particle swarm optimization," *Proceedings of IEEE International Conference on Neural Networks*, 4:1942-1948, 1995.
Liu and Magnusson, "Concept of multiorder multimode resonant optical filters," *IEEE Photonics Technol. Lett.*, 14:1091-1093, 2002.
Magnusson and Ding, "MEMS tunable resonant leaky mode filters," *IEEE Photonics Technol. Lett.*, 18:1479-1481, 2006.
Magnusson and Shin, "Diffractive Optical Components," *Encyclopedia of Physical Science and Technology*, $3^{rd}$ ed., 4:421-440, 2002.
Magnusson and Shokooh-Saremi, "Physical basis for wideband resonant reflectors," *Opt. Express*, 16:3456-3462, 2008.
Magnusson and Shokooh-Saremi, "Widely tunable guided-mode resonance nanoelectromechanical RGB pixels," *Opt. Express*, 15:10903-10910, 2007.
Magnusson et al., "Dispersion engineering with leaky-mode resonant photonic lattices," *Opt. Express*, 18:108-116, 2010.
Magnusson et al., "Guided-mode resonant wave plates," *Optics Letters*, 35(14):2472-2474, 2010.
Mashev and Popov, "Zero order anomaly of dielectric coated gratings," *Opt. Comm.*, 55:377-380, 1985.
Mateus et al., "Broad-band mirror (1.12-1.62 μm) using a subwavelength grating," *IEEE Photonics Tech. Lett.*, 16:1676-1678, 2004.
Mateus et al., "Ultrabroadband mirror using low-index cladded subwavelength grating," *IEEE Photonics Tech. Lett.*, 16:518-520, 2004.
Moharam et al., "Stable implementation of the rigorous coupled-wave analysis for surface-relief gratings: Enhanced transmittance matrix approach," *J. Opt. Soc. Am. A*, 12:1077-1086, 1995.
Popov et al., "Theoretical study of anomalies of coated dielectric gratings," *Opt. Acta*, 33:607-619, 1986.
Robinson and Rahmat-Samii, "Particle swarm optimization in electromagnetics," *IEEE Trans. Ant. Propagat.*, 52:397-407, 2004.
Shokooh-Saremi and Magnusson, "Particle swarm optimization and its application to the design of diffraction grating filters," *Opt. Lett.*, 32:894-896, 2007.
Suh and Fan, "All-pass transmission or flattop reflection filters using a single photonic crystal slab," *Appl. Phys. Lett.*, 84:4905-4907, 2004.
Vartiainen et al., "Depolarization of quasi-monochromatic light by thin resonant gratings," *Opt. Lett.*, 34:1648-1650, 2009.
Vincent and Neviere, "Corrugated dielectric waveguides: A numerical study of the second-order stop bands," *Appl. Phys.*, 20:345-351, 1979.
Wang and Magnusson, "Theory and applications of guided-mode resonance filters," *Appl. Opt.*, 32:2606-2613, 1993.
Yu et al., "Synthesis of Wave Plates Using Multilayered Subwavelength Structure," *J. Appl. Phys.*, 43:L439-L441, 2004.

\* cited by examiner

LEAKY-MODE RESONANT RETARDERS AND RELATED METHODS

CROSS REFERENCE TO RELATED APPLICATION

This application claims priority to U.S. Provisional Patent Application No. 61/348,289, filed May 26, 2010, which is incorporated reference in its entirety.

STATEMENT REGARDING FEDERALLY SPONSORED RESEARCH

This invention was made with government support under grant number ECCS-0925774 awarded by the National Science Foundation. The government has certain rights in the invention.

BACKGROUND

1. Field

This invention relates to leaky-mode resonant retarders (wave plates). The methods and devices disclosed can be applied, for example in telecommunication systems, laser systems, display systems, optical logic devices, and nanophotonic chips.

2. Description of the Related Art

Multilayer thin films are widely applied to implement filters, polarizers, and reflectors for incorporation in various common optical systems. These devices typically consist of stacks of homogeneous layers deposited with precise thicknesses and tight control of index of refraction and absorption. In many cases, a large number of layers, perhaps ~10-100, may be needed to create the spectral, polarization, and angular attributes required for a particular application. These optical devices operate on the basis of multiple reflections between the interfaces incorporated in a layered stack. In particular, periodic quarter-wave layer systems provide classical high reflectors for bulk laser cavities as well as integrated distributed Bragg reflectors for vertical cavity lasers. Bragg reflectors yield efficient reflection across wide spectral bands [H. A. Macleod, Thin-Film Optical Filters, (McGraw-Hill, New York, 1989).]. Additionally, subwavelength periodic layers exhibit strong resonance effects that originate in quasi-guided, or leaky, waveguide modes. These compact elements yield versatile photonic spectra [E. Popov, L. Mashev, and D. Maystre, "Theoretical study of anomalies of coated dielectric gratings," Opt. Acta 33, 607-619 (1986); G. A. Golubenko, A. S. Svakhin, V. A. Sychugov, and A. V. Tishchenko, "Total reflection of light from a corrugated surface of a dielectric waveguide," Soy. J. Quantum Electron. 15, 886-887 (1985); I. A. Avrutsky and V. A. Sychugov, "Reflection of a beam of finite size from a corrugated waveguide," J. Mod. Opt. 36, 1527-1539 (1989); S. S. Wang and R. Magnusson, "Theory and applications of guided-mode resonance filters," Appl. Opt. 32, 2606-2613 (1993)]. The spectral expressions generated by resonant leaky-mode layers in some ways resemble spectral expressions associated with thin-film systems. In other ways, the resonance response is unique and not realizable with homogeneous thin films. Therefore, the functionality and applicability of thin films in optics and photonics technology can be complemented and enhanced by imbuing them with appropriate periodic modulation to achieve leaky-mode resonance. Using powerful electromagnetic design methods, the spectral bands of subwavelength resonant leaky-mode elements can be engineered to achieve photonic devices with practical attributes. For example, it has been shown that a single periodic layer with one-dimensional periodicity enables narrow-line filters, polarizers, reflectors, and polarization-independent elements [Y. Ding and R. Magnusson, "Resonant leaky-mode spectral-band engineering and device applications," Opt. Express 12, 5661-5674 (2004)]. Additionally, tunable filters and display pixels are feasible as discussed in [R. Magnusson and Y. Ding, "MEMS tunable resonant leaky mode filters," IEEE Photonics Technol. Lett. 18, 1479-1481 (2006); R. Magnusson and M. Shokooh-Saremi, "Widely tunable guided-mode resonance nanoelectromechanical RGB pixels," Opt. Express 15, 10903-10910 (2007)].

Efficient reflection of light across wide spectral bands is essential in a plethora of common photonic systems. Classic mirrors are made with evaporated metal films and dielectric multilayer stacks. These ordinary devices have been widely studied for a long time and are well understood. A new method to achieve effective wideband reflection response has recently emerged. This approach is based on leaky-mode resonance effects in single-layer, high-refractive index contrast, one-dimensional (1D) and two-dimensional (2D) waveguide gratings. Briefly reviewing the relevant work and literature, the pursuit of resonant wideband response can be traced to Gale et al. [M. T. Gale, K. Knop, and R. Morf, "Zero-order diffractive microstructures for security applications," Proc. SPIE 1210, 83-89 (1990)] and to Brundrett et al. [D. L. Brundrett, E. N. Glytsis, and T. K. Gaylord, "Normal-incidence guided-mode resonant grating filters: design and experimental demonstrations," Opt. Lett. 23, 700-702 (1998)] who achieved experimental full-width half-maximum (FWHM) linewidths near 100 nm albeit not for flat spectra. Applying cascaded resonance structures, Jacob et al. designed narrow-band flattop filters that exhibited lowered sidebands and steepened stopbands [D. K. Jacob, S. C. Dunn, and M. G. Moharam, "Normally incident resonant grating reflection filters for efficient narrow-band spectral filtering of finite beams," J. Opt. Soc. Am. A 18, 2109-2120 (2001)]. Alternatively, by coupling several diffraction orders into corresponding leaky modes in a two-waveguide system, Liu et al. found a widened spectral response and steep filter sidewalls generated by merged resonance peaks [Z. S. Liu and R. Magnusson, "Concept of multiorder multimode resonant optical filters," IEEE Photonics Technol. Lett. 14, 1091-1093 (2002)]. Suh et al. designed a flattop reflection filter using a 2D-patterned photonic crystal slab [W. Suh and S. Fan, "All-pass transmission or flattop reflection filters using a single photonic crystal slab," Appl. Phys. Lett. 84, 4905-4907 (2004)]. Emphasizing new modalities introduced by asymmetric profiles, Ding et al. presented single-layer elements exhibiting both narrow and wide flat-band spectra [Y. Ding and R. Magnusson, "Use of nondegenerate resonant leaky modes to fashion diverse optical spectra," Opt. Express 12, 1885-1891 (2004)]. Using a subwavelength grating with a low-index sublayer on a silicon substrate, Mateus et al. designed flattop reflectors with linewidths of several hundred nanometers operating in TM polarization [C. F. R. Mateus, M. C. Y. Huang, Y. Deng, A. R. Neureuther, and C. J. Chang-Hasnain, "Ultrabroadband mirror using low-index cladding subwavelength grating," IEEE Photonics Technol. Lett. 16, 518-520 (2004)]. Subsequently, they fabricated a reflector with reflectance exceeding 98.5% over a 500 nm range and compared the response with numerical simulations [C. F. R. Mateus, M. C. Y. Huang, L. Chen, C. J. Chang-Hasnain, and Y. Suzuki, "Broad-band mirror (1.12-1.62 µm) using a subwavelength grating," IEEE Photonics Technol. Lett. 16, 1676-1678 (2004)]. Ding et al. showed single-layer elements with ~600 nm flattop reflectance in both TE and TM polarization [Y. Ding and R. Magnusson, "Resonant leaky-mode spectral-band engineering and device applications," Opt. Express 12, 5661-5674 (2004)]. Most recently, Magnusson et al. provided detailed physical basis for such broadband leaky-mode reflectors by treating the simplest possible case, which was a single-layer, one-dimensionally patterned waveguide grating [R. Magnusson and M. Shokooh-Saremi, "Physical basis for wideband resonant reflectors," Opt. Express 16, 3456-3462 (2008)].

Leaky-mode resonant elements can be applied to control the state of polarization. This basic idea was disclosed in a patent application in U.S. Pat. No. 7,689,086 [R. Magnusson and Y. Ding, "Resonant leaky-mode optical devices and associated methods"].

Moreover, the phase response is key in slow-light and photonic buffer design [R. Magnusson, M. Shokooh-Saremi, and X. Wang, "Dispersion engineering with leaky-mode resonant photonic lattices," Opt. Express 18, 108-116 (2010)]. Recently, Vartiainen et al. applied a resonant grating to design a depolarizing device. They imposed conditions of total internal reflection to secure equal-amplitude reflection of both TE and TM polarization states even though only one of these was resonant at the design wavelength [I. Vartiainen, J. Tervo, and M. Kuittinen, "Depolarization of quasi-monochromatic light by thin resonant gratings," Opt. Lett. 34, 1648-1650 (2009)]. As the phase difference between the polarization components is spectrally variable, a differing phase shift applies across the spectrum of a source with finite linewidth thereby implementing depolarization.

SUMMARY

A leaky-mode resonant retarder is presented. In some embodiments, the leaky-mode resonant retarder includes a substrate and a spatially modulated periodic layer coupled to the substrate, where the spatially modulated periodic layer is configured to shift a phase between two perpendicular electric-field components of incident light.

In some embodiments, the spatially modulated periodic layer may be a first spatially modulated periodic layer and the leaky-mode resonant retarder may further include a second spatially modulated periodic layer coupled to the first spatially modulated periodic layer. In addition, in some embodiments, a homogeneous layer may be coupled to the spatially modulated periodic layer. In some embodiments, the spatially modulated periodic layer may be configured to shift the phase between the two perpendicular electric-field components by about $\pi/2$ radians. In other embodiments, the spatially modulated periodic layer may be configured to shift the phase between the two perpendicular electric-field components by about $\pi$ radians.

In some embodiments, the leaky-mode resonant retarder may be configured to reflect the incident light. For example, the leaky-mode resonant retarder may be configured to reflect more than 95% of each component of the incident light. Also, the leaky-mode resonant retarder may be configured to reflect more than 95% of each component of the incident light having a wavelength in the range of 1.5 µm and 1.6 µm.

In some embodiments, the spatially modulated periodic layer may be configured to shift the phase between the two perpendicular electric-field components of the incident light and where the incident light is incident on a surface of the leaky-mode resonant retarder at an oblique angle. In some embodiments, the spatially modulated periodic layer may be configured to shift the phase between the two perpendicular electric-field components of incident light and where the incident light is incident on a surface of the leaky-mode resonant retarder at an angle of about 45°.

In some embodiments, the retarder may be configured to shift the phase between the two perpendicular electric-field components while transmitting the incident light.

A method for shifting a polarization between two perpendicular electric-field components of light is also presented. In some embodiments, the method may include receiving, at a surface of a leaky-mode resonant retarder, incident light having two perpendicular electric-field components. Also, in some embodiments, the method may include shifting, using the leaky-mode resonant retarder, a phase between the two perpendicular electric-field components.

In some embodiments shifting the phase between the two perpendicular electric-field components may result in a shift of about $\pi/2$ radians. In other embodiments, shifting the phase between the two perpendicular electric-field components results in a shift of about $\pi$ radians.

In some embodiments, the method includes reflecting the incident light. For example, reflecting the incident light may include reflecting more than 95% of each component of the incident light. Also, reflecting the incident light may include reflecting more than 95% of each component of the incident light having a wavelength in the range of 1.5 µm and 1.6 µm.

In some embodiments, receiving the incident light at the surface of the leaky-mode resonant retarder may be receiving the light at an oblique angle to the surface. For example, the oblique angle may be about 45°.

In some embodiments, the methods described herein may further include transmitting the incident light. For example, transmitting the incident light may further include transmitting more than 95% of each component of the incident light. Also, transmitting the incident light may further include transmitting more than 95% of each component of the incident light having a wavelength in the range of 1.5 µm and 1.6 µm.

The term "coupled" is defined as connected, although not necessarily directly, and not necessarily mechanically.

The terms "a" and "an" are defined as one or more unless this disclosure explicitly requires otherwise.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

The term "substantially" and its variations (e.g. "approximately" and "about") are defined as being largely but not necessarily wholly what is specified (and include wholly what is specified) as understood by one of ordinary skill in the art. In any embodiment of the present disclosure, the terms "substantially," "approximately," and "about" may be substituted with "within [a percentage] of" what is specified, where the percentage includes 0.1, 1, 5, and 10 percent Any embodiment of any of the present devices and methods can consist of or consist essentially of—rather than comprise/include/contain/have—any of the described elements/ steps and/or features. Thus, in any of the claims, the term "consisting of" or "consisting essentially of" can be substituted for any of the open-ended linking verbs recited above, in order to change the scope of a given claim from what it would otherwise be using the open-ended linking verb.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

Figure 1A:
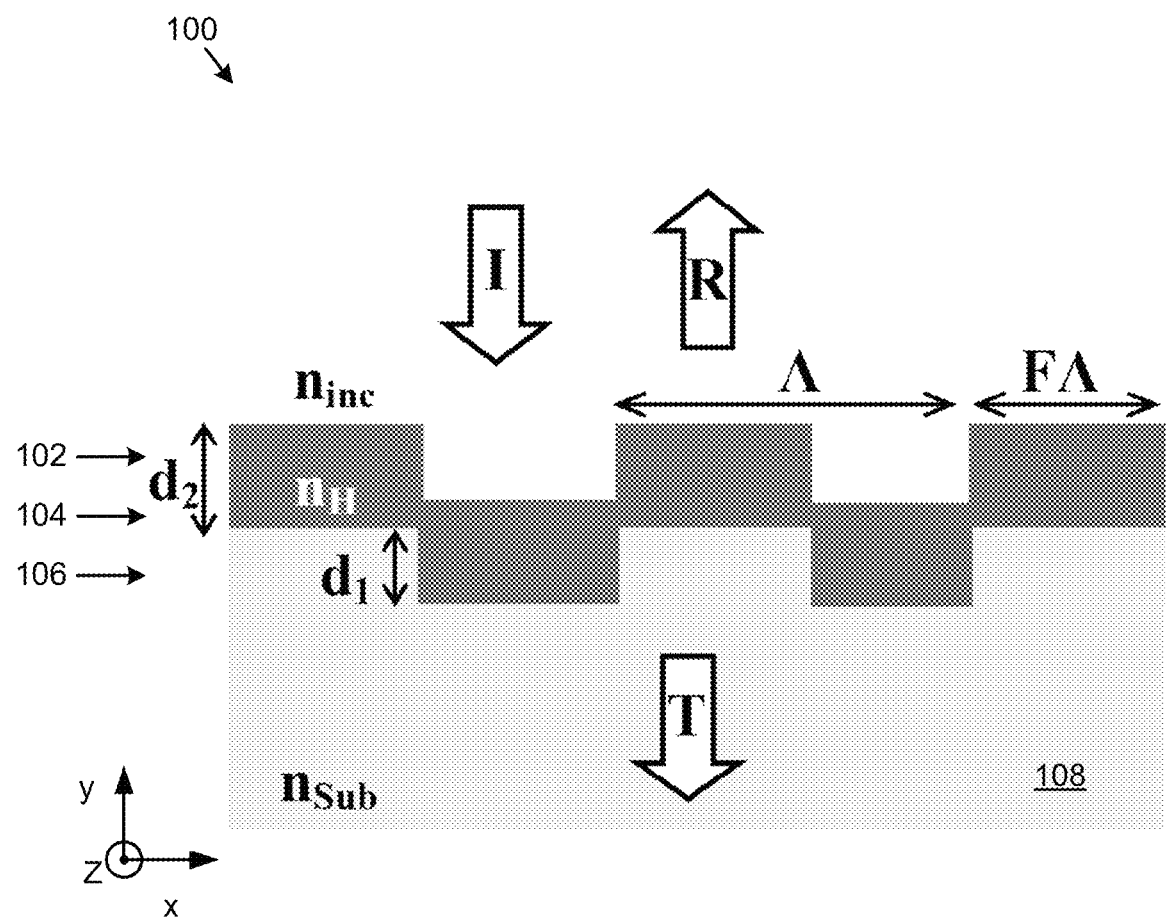
FIG. 1A is an illustration of a cross-section of one of the present multilayer diffractive structures that may be representative of a half-wave plate.

The present disclosure shows that by purposefully inducing resonant leaky modes on appropriate periodic structures, improved electromagnetic characteristics can be provided. Several example designs of such structures with detailed parametric sets are provided and their operational regions shown. This disclosure shows examples of the beneficial control of both amplitude and phase of electromagnetic waves. This control is used to fashion new types of wave plates as detailed further below. Both half-wave plates and quarter-wave plates can be implemented with this methodology. The current disclosure provides detailed device embodiments and methods that may be used to implement them.

Precise control of the state of polarization of light is of interest in a host of practical applications. Retarders impart specific values of phase retardation between orthogonal polarization states to achieve a desired final state. In particular, some retarders, known as half-wave plates, impart a retardance of about $\pi$ (including, ideally, $\pi$) to achieve rotation of linear polarization. Other retarders, known as quarter-wave plates, impart a retardance of about $\pi/2$ (including, ideally, $\pi/2$) and may yield linear-to-circular (TE and TM electric field components have equal magnitude) or linear-to-elliptical (TE and TM electric field components have unequal magnitude) polarization conversion. Wave plates are sometimes fabricated using natural anisotropic crystals. Alternatively, they can be made with subwavelength gratings possessing artificial birefringence. The examples provided herein show that the guided-mode (or leaky-mode) resonance effect occurring in subwavelength waveguide gratings is applicable to control the state of polarization of light and to implement compact wave plates.

Thus, one aspect of the present disclosure refers to a new type of optical device based on the resonant leaky-mode effect. The new structures may, in some embodiments, comprise multiple patterned and/or unpatterned layers. This multilevel arrangement allows excitation and interaction of multiple leaky modes in such a way that broad reflection spectra are attainable with near-simultaneous (including, preferably, simultaneous) prespecified phase response for both polarization components of the light. In some embodiments, the disclosed devices are based on conformal films adhering to a variety of surface-relief substructures. In these structures, more than one waveguide and/or coupling grating may be present. Therefore, in some embodiments, more flexibility is obtainable in the design stage due to a larger number of available design parameters (degrees of freedom). This arrangement supports adjacent, distinct resonance frequencies or wavelengths. By proper device design, these adjacent resonances can interact, overlap, and exhibit flat broadband reflection, polarization, or beam-dividing response along with appropriate phase response to implement wave plates.

Advantages and features associated with some aspects identified and discussed in the present disclosure can be utilized in designing various types of retarders for polarization control. The devices can have any one-dimensional (1D) or two-dimensional (2D) patterning or both 1D and 2D simultaneously.

New wave plates based on resonant leaky modes in periodically modulated films are provided by the present disclosure along with a number of exemplary illustrative implementations.

With reference to FIG. 1A, the period ($\Lambda$) can be, by design, divided into multiple different parts. For example, in FIG. 1A, it is shown that the period is divided into two parts. The fill (or filling) factors (fraction of period occupied by a particular material) are denoted by F. In this figure, I, R, and T are the incident wave, reflectance, and transmittance, respectively. The angle of incidence, generally denoted as $\theta$, is arbitrary (set to lie in the range of zero to ninety degrees relative to the surface normal) and is set to zero (normal incidence) in this example. While the incident wave can be directed at the structure at any angle, $\theta$, the special case of normal incidence may be of high practical interest. The incident wave can have two polarizations, transverse electric (TE) and transverse magnetic (TM). It can also have random polarization or be unpolarized. When the electric field vector is normal to the plane of incidence, the polarization is known as TE; when the magnetic field is thus directed, the polarization is known as TM. If the period of the structure is smaller than the incident wavelength, the subwavelength regime prevails; hence, only the zero-order diffraction orders are propagating and the higher orders will be evanescent. The first-order or higher-order evanescent diffraction waves generated by the patterned layers induce resonances by being coupled to leaky modes. Thus, thin-film structures containing waveguide layers and periodic elements, under proper phase-matching conditions, can exhibit the guided-mode resonance (GMR) effect, also called the leaky-mode resonance effect.

To find the optimal structural parameters of a two-level, three-level, or, in general, a multilevel leaky-mode resonance element with desired spectral phase and/or amplitude response, one may employ two types of mathematical tools, namely analysis/simulation and design/optimization tools. In the analysis and simulation of the proposed structures, one may first numerically solve fundamental electromagnetics equations with the proper boundary conditions. These numerical results, which can provide the efficiencies of the diffraction orders and associated phases and also quantitative electromagnetic field distributions, may be obtained by utilizing rigorous coupled-wave analysis (RCWA) and also modal analysis methods. These methods also provide computational kernels in the design process.

Another aspect of the present disclosure is directed to the method for realizing these optical devices. Design of these leaky-mode resonant elements with specified response due to the possible complexity of the device architecture, the potentially large number of variable parameters, and attendant leaky-mode interaction is challenging. Therefore, powerful and robust design and optimization techniques should preferably be used to find the optimal structural parameters.

Particle Swarm Optimization (PSO)

A technique used to design the leaky-mode resonance elements is called particle swarm optimization (PSO). PSO is a robust, stochastic evolutionary technique. Although there are several methods for analysis of diffraction gratings, design of these elements with strictly specified spectral properties is generally a challenging problem. As used herein, "spectra" refer to the wavelength or frequency spectra as well as to angular spectra. Design and synthesis techniques based on evolutionary strategies (mainly genetic algorithms) have found applications in this area. PSO has been recently utilized in electromagnetic design problems. This method [J. Kennedy and R. Eberhart, "Particle swarm optimization," in Proc. Conf. Neural Network (Institute of Electrical and Electronics Engineers, Perth, Australia, 1995), pp. 1942-1948] is inspired from social behavior of animal species like birds, bees, and others ("particles"), looking for their requirements in the search area. The algorithm finds the optimal solution by moving the particles in the search space. PSO lets every individual within the swarm move from a given point to a new one with a velocity based on a weighted combination of the individual's current velocity, best position ever found by that individual, and the group's best position.

In PSO, each particle of a swarm is considered as a point in an N-dimensional search space, which adjusts its movement according to its own experience as well as the experience of other particles. Each particle is represented by an N-parameter vector given by $$X_m = \{x_{1m}, x_{2m}, \ldots, x_{Nm}\} \quad 1 \leq m \leq N_{POP} \quad (1)$$

where m is an integer that indicates the position of the particle in the swarm, which comprises $N_{POP}$ particles. For numerical evaluation of the quality of particles, a fitness function (FF) is defined and computed for each particle according to its optimization parameters. The algorithm initiates by randomly locating particles moving with random velocities. Velocity is the rate of a particle's position change and is represented by $V_m = \{v_{1m}, v_{2m}, \ldots, v_{Nm}\}$. The fitness function is calculated for all particles in the initial swarm. The best previous particle position ($P_{best}$) is set initially to the first random particle position, $P_m = \{p_{1m}, p_{2m}, \ldots, p_{Nm}\}$, and the position of the best particle in the swarm ($G_{best}$, as defined by the fitness function) is kept as the swarm's best position (G). The modification of the particle's position in (k+1)th iteration can be modeled as follows:

$$V_m^{k+1} = wV_m^k + c_1 \text{rand}_1(\ )(P_m - X_m^k) + c_2 \text{rand}_2(\ )(G - X_m^k) \quad (2)$$

$$X_m^{k+1} = X_m^k + V_m^{k+1} \Delta t \quad (3)$$

where w is the inertia weight, $c_1$ and $c_2$ are called cognitive and social rates, respectively, and $\text{rand}_1(\ )$ and $\text{rand}_2(\ )$ are two uniformly distributed random numbers between 0 and 1 [J. Robinson and Y. Rahmat-Samii, "Particle swarm optimization in electromagnetics," IEEE Trans. Ant. Propagat. 52, 397-407 (2004)]. Equation (2) shows that the new particle's velocity has memory of the previous velocity, its own best position, and the best position of the swarm. The position of each particle is then updated according to Eq. (3), in which $\Delta t$ is the time step (here $\Delta t=1.0$). Also, $P_m$ and G are updated based on the following rules:

$P_m$ update rule: if $FF(X_m^{k+1})$ is better than $FF(P_m)$, then $P_m = X_m^{k+1}$ G update rule: if best of $FF(P_m, 1 \leq m \leq N_{POP})$ is better than $FF(G)$, then G=best of $(P_m, 1 \leq m \leq N_{POP})$ The iterations continue, by returning to calculation of Eqs. (2) and (3), until either an optimum solution is obtained or the maximum number of iterations is met. The algorithm summarized here is referred to as standard, real-coded PSO further discussed in [M. Shokooh-Saremi and R. Magnusson, "Particle swarm optimization and its application to the design of diffraction grating filters," Opt. Lett. 32, 894-896 (2007)].

EXAMPLES

In accordance with a preferred aspect of the present disclosure, it is possible to design and build retarders with desired reflectance levels, phase shifts, and bandwidths. It is possible to find the proper structural parameters for fabrication of these devices such as demonstrated by the following examples. The Examples are not discussing devices that have been physically built and tested, though one of ordinary skill in the art having the benefit of this disclosure will understand how to fabricate these devices.

Example 1

FIG. 1A shows a model half-wave plate structure 100. As seen in FIG. 1A, a spatially modulated periodic layer (102, 104, and/or 106) is coupled to the substrate 108. The spatially modulated periodic layer is configured to shift a phase between two perpendicular electric-field components of incident light ("I"). For example, the electric field vector E of the incident wave may be oriented at 45° to both the x-axis and the z-axis (the z-axis being oriented orthogonal to the page and thus to both x and y) and thus have components $E_x$ and $E_z$. The phase shift may then act to retard one of these field-vector components relative to the other. For example, the phase shift may act to retard $E_x$ relative to $E_z$ to implement the devices disclosed.

Figure 1B:
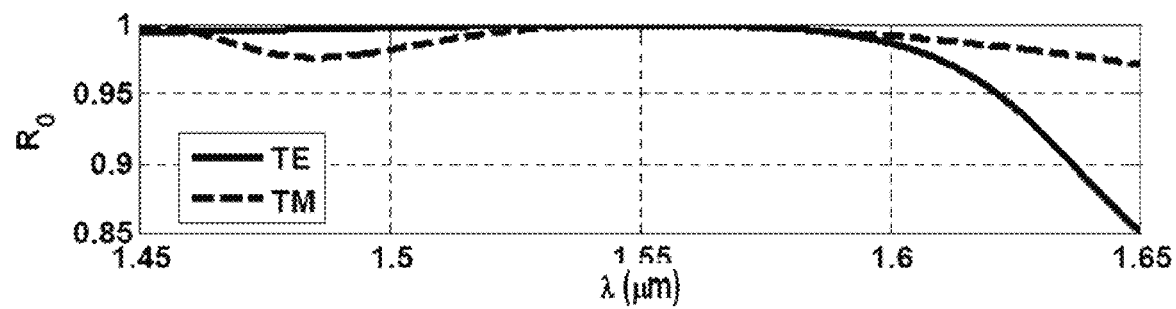
FIG. 1B shows the reflectance of the half-wave retarder of FIG. 1A.
Figure 1C:
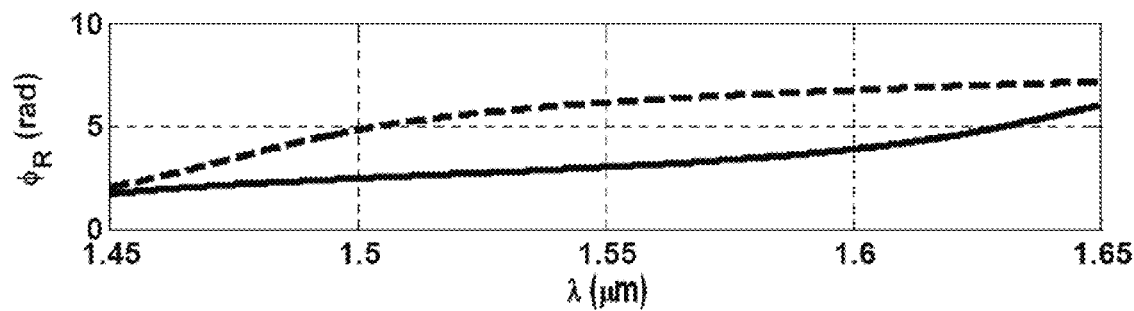
FIG. 1C shows the spectral phase response of the half-wave retarder of FIG. 1A for TE and TM polarizations.
Figure 1D:
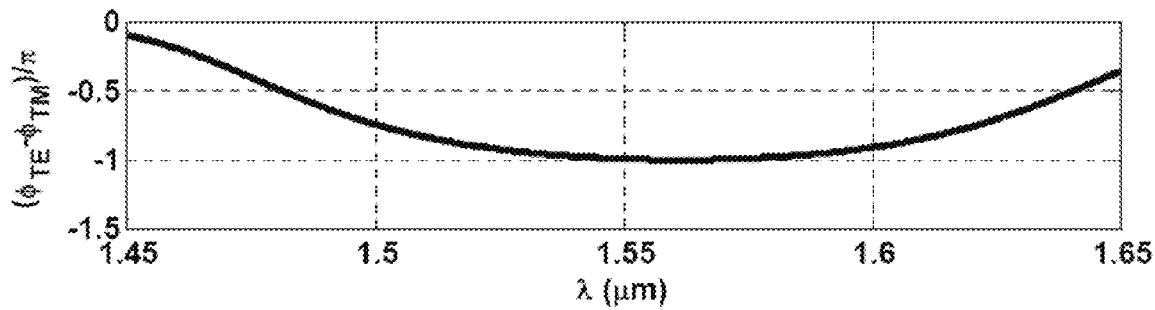
FIG. 1D shows the phase shift between the TE and TM polarizations for the half-wave retarder of FIG. 1A.

To design this element, the incidence and substrate media are assumed to be air ($n_{inc}$=1.0) and silica ($n_{sub}$=1.48), respectively. Refractive index of silicon ($n_H$) is taken to be 3.48. The device is illuminated (I) normally (θ=0) with light having TE and TM polarization states where TE- (TM-) polarized light has electric (magnetic) field vector perpendicular to the plane of incidence. The PSO-designed retarder has an effective three-level structure shown in FIG. 1A with a rectangular spatial profile where period (Λ), thickness of each layer ($d_1$ and $d_2$), and fill factor (F) are the optimization parameters to be found by the PSO algorithm. In this particular example, the top level 102 is a silicon/air grating, the bottom level 106 is a silica/silicon grating, and the middle layer 104 is a homogeneous (non-periodic) layer. The period and fill factors are found to be Λ=786.8 nm and F=0.2665. In addition, the thicknesses of the layers are determined to be $d_1$=525.3 nm, and $d_2$=624.6 nm. The bandwidth of this retarder for which zero-order reflectance $R_{0TE}$=$R_{0TM}$~1.0 and phase difference $|\phi_{TE}-\phi_{TM}|$~π exceeds 50 nm as seen in FIGS. 1B-D.

Example 2

Figure 2A:
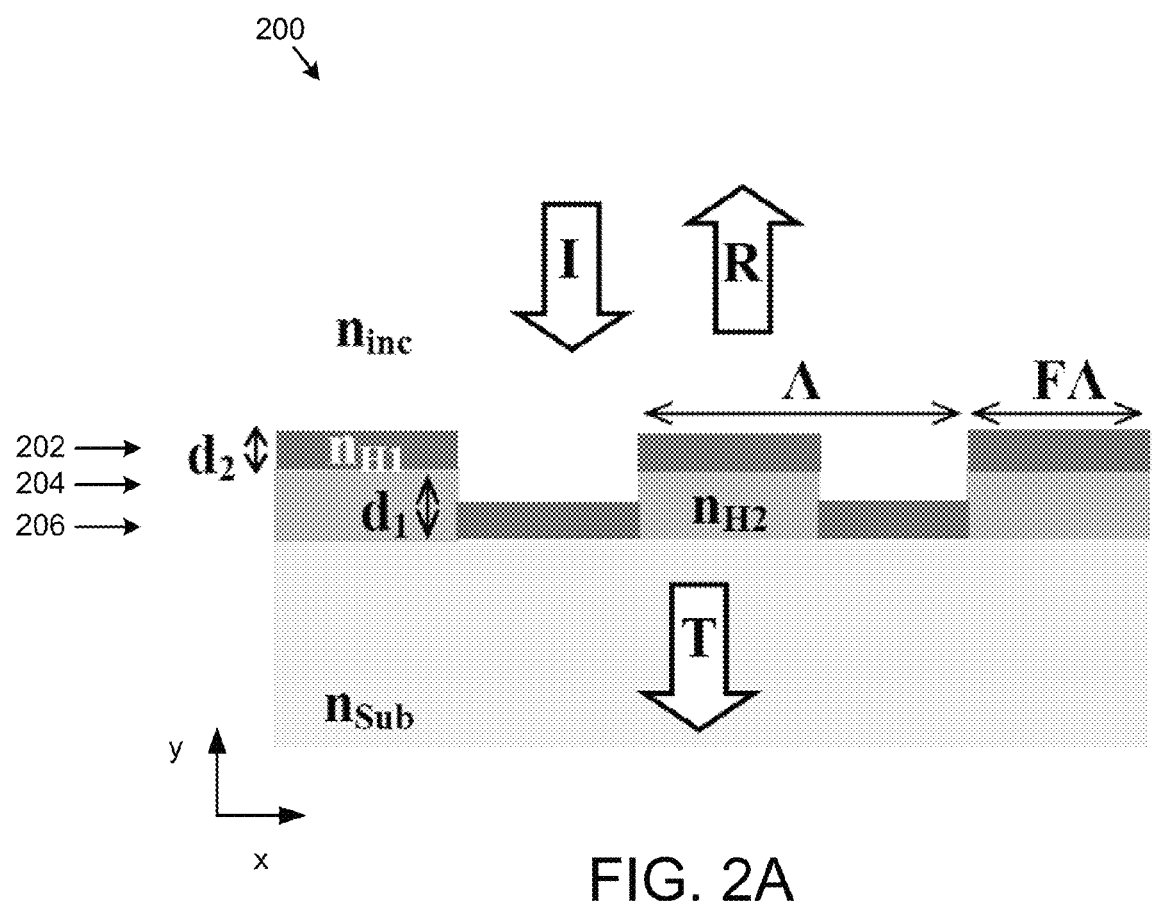
FIG. 2A is an illustration of one of the present wideband half-wave retarders.
Figure 2B:
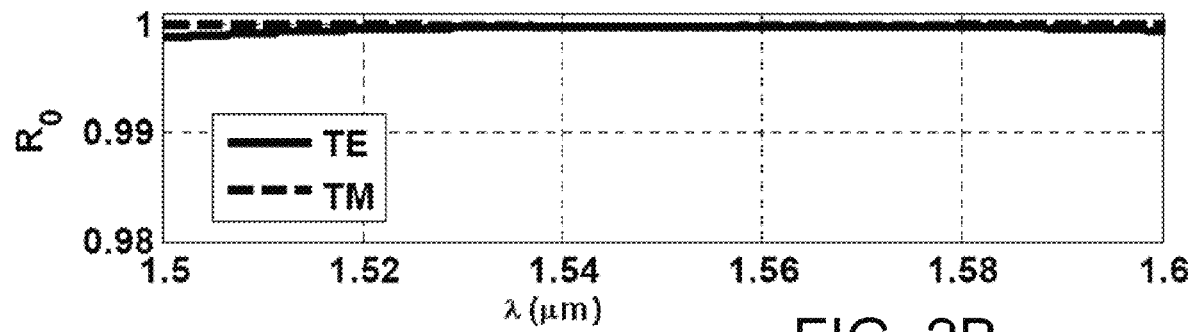
FIG. 2B shows the reflectance of the half-wave retarder of FIG. 2A.
Figure 2C:
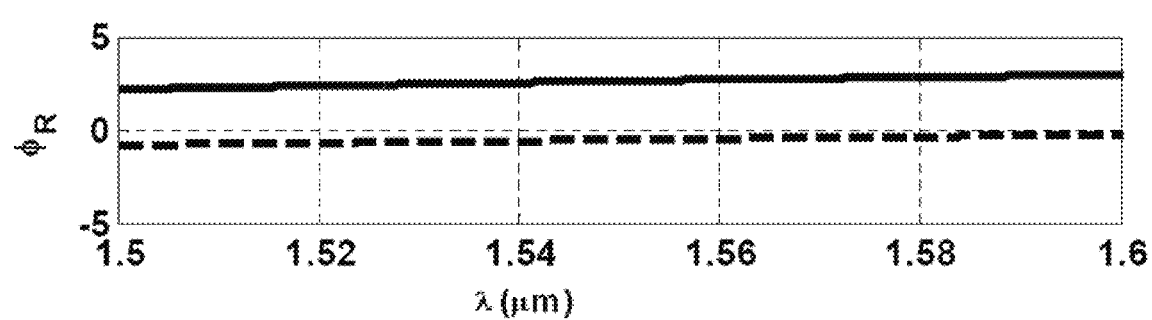
FIG. 2C shows the spectral phase response of the half-wave retarder of FIG. 2A for TE and TM polarizations.
Figure 2D:
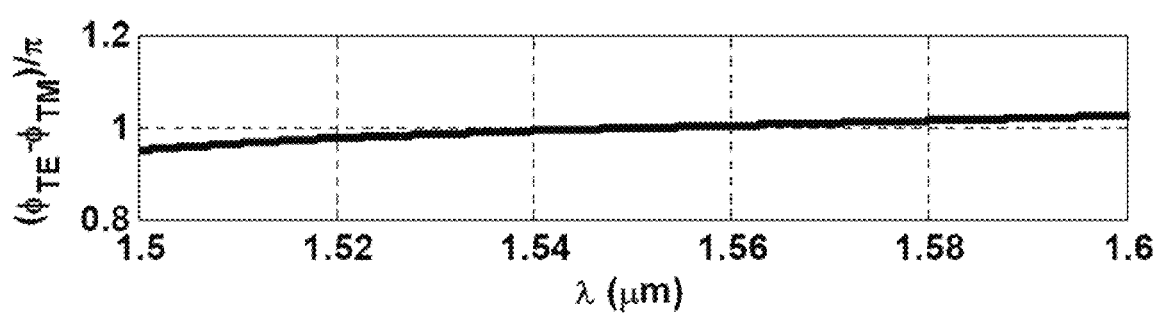
FIG. 2D shows the phase shift between the TE and TM polarizations for the half-wave retarder of FIG. 2A.

FIG. 2A shows an example of architecture for a wideband half-wave retarder 200 designed with PSO. Again, the incidence and substrate media are assumed to be air ($n_{inc}$=1.0) and silica ($n_{sub}$=1.48). The device is illuminated (I) normally (θ=0) with light having TE and TM polarization states where TE- (TM-) polarized light has electric (magnetic) field vector perpendicular to the plane of incidence. Broadband retardance across ~100 nm with center wavelength being 1550 nm is achieved at the cost of a more complex design involving silicon with $n_{H1}$=3.48 and hafnium dioxide (HfO$_2$) with $n_{H2}$=2.0 as shown in FIG. 2A. In this example, the top layer 202 is a silicon/air grating. The middle layer 204 is a HfO$_2$/air grating, and the lower layer 206 is a silicon/HfO$_2$ grating. The optimized parameters of this element are determined as Λ=780.9 nm, F=0.4876, $d_1$=1086.2 nm, and $d_2$=375.3 nm. The bandwidth of this retarder for which zero-order reflectance $R_{0TE}$=$R_{0TM}$~1.0 and phase difference $|\phi_{TE}-\phi_{TM}|$~π exceeds 100 nm as seen in FIGS. 2B-D.

Example 3

Figure 3A:
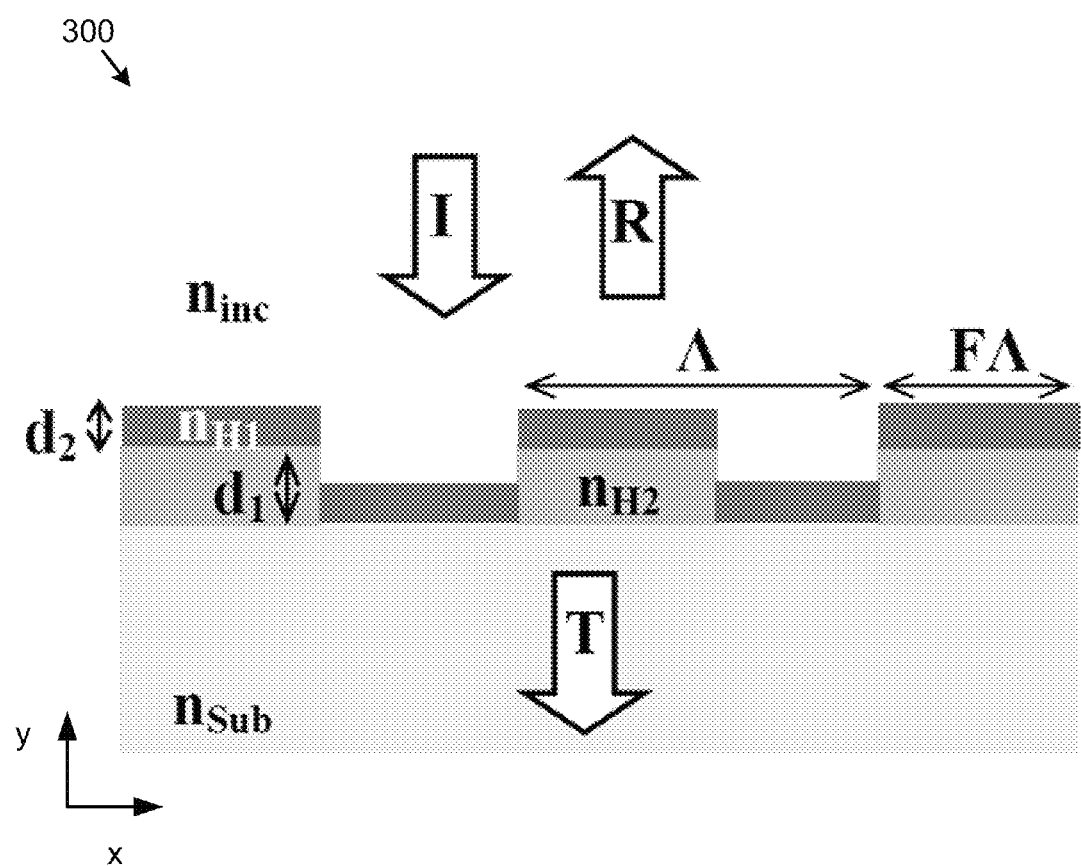
FIG. 3A is an illustration of one of the present quarter-wave retarders.
Figure 3B:
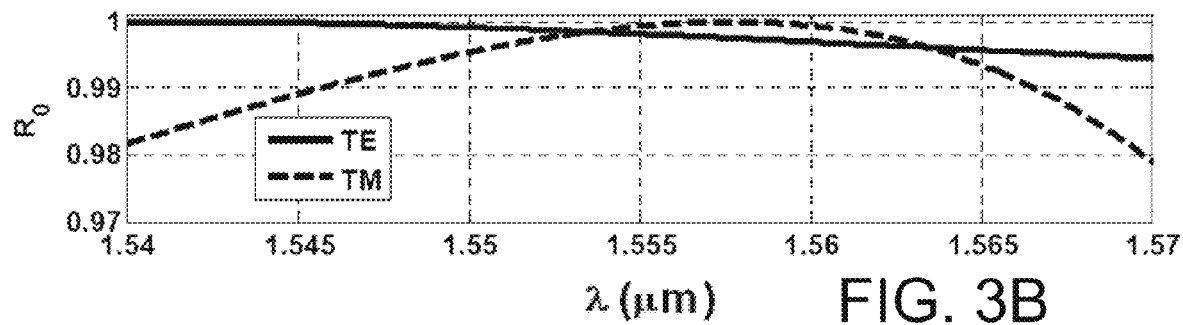
FIG. 3B shows the reflectance of the quarter-wave retarder shown in FIG. 3A.
Figure 3C:
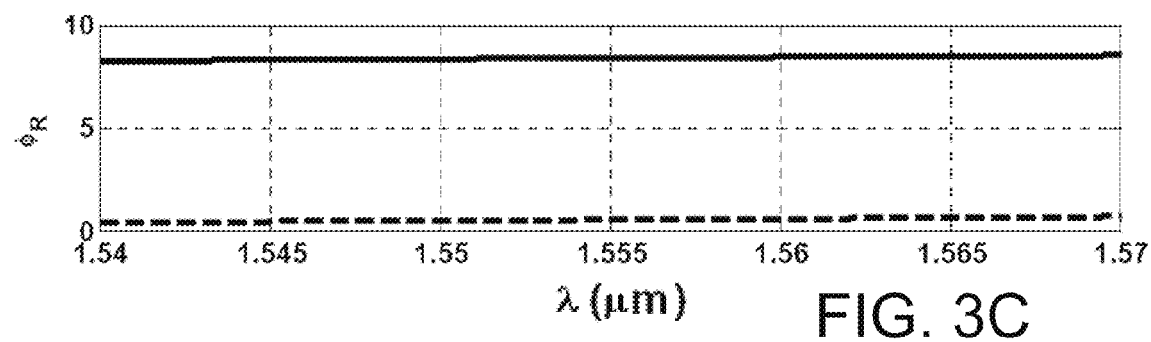
FIG. 3C shows the spectral phase response of the quarter-wave retarder of FIG. 3A for TE and TM polarizations.
Figure 3D:
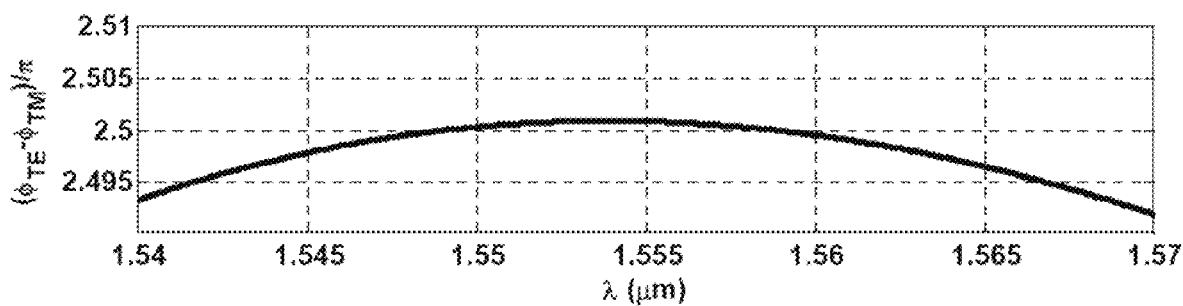
FIG. 3D shows the phase shift between the TE and TM polarizations for the quarter-wave retarder shown in FIG. 3A.

FIG. 3A shows a quarter-wave retarder 300. This device has the same profile shown in FIG. 2A, and the materials are taken to be the same. The difference between the retarders of FIGS. 2A and 3A are the dimensions of the different elements. In this example, the parameters are: Λ=878.9 nm, F=0.3072, $d_1$=586.1 nm, and $d_2$=413.8 nm. As seen in FIGS. 3B-D, the amplitudes of the TE and TM polarization components are matched to better than 99% for a wavelength band of ~20 nm with the phase near 2.5π (which is operatively π/2) in the band.

Figure 4A:
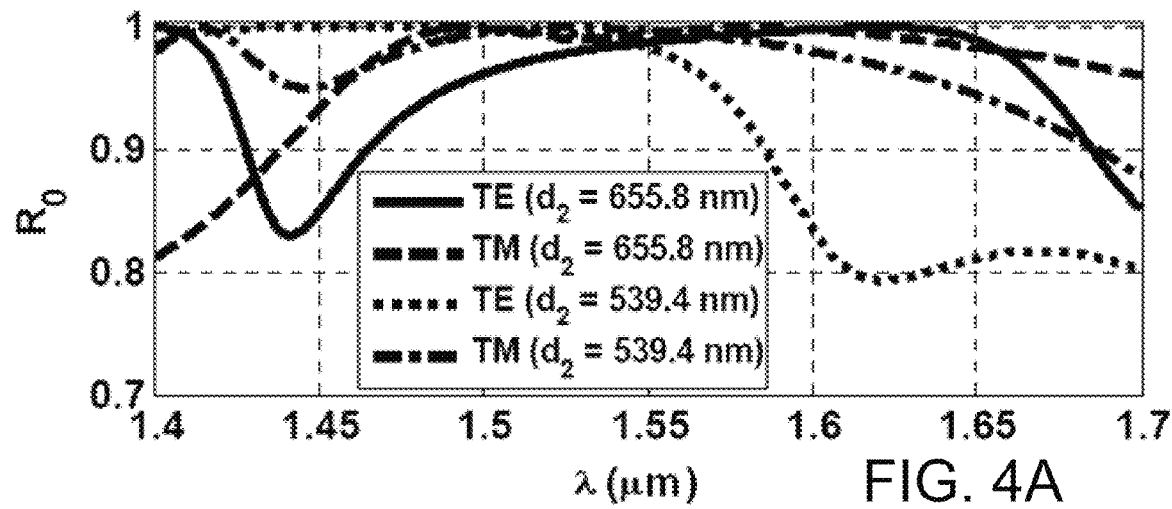
FIGS. 4A-B show the reflectance and spectral phase difference of the retarder design shown in FIG. 1A under ±5.0% deviation in silicon thickness ($d_2$ of FIG. 1A).
Figure 4B:
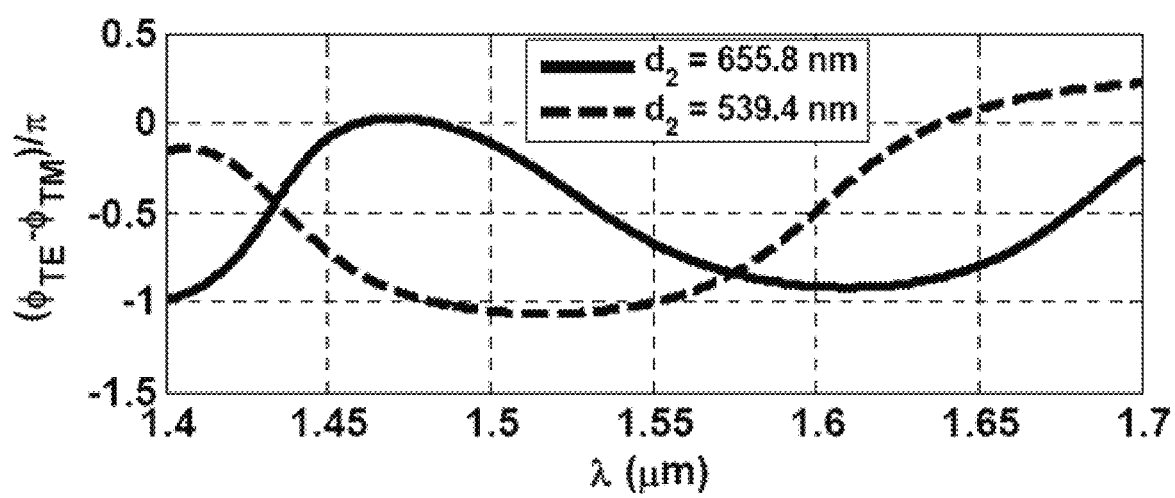
Figure 4C:
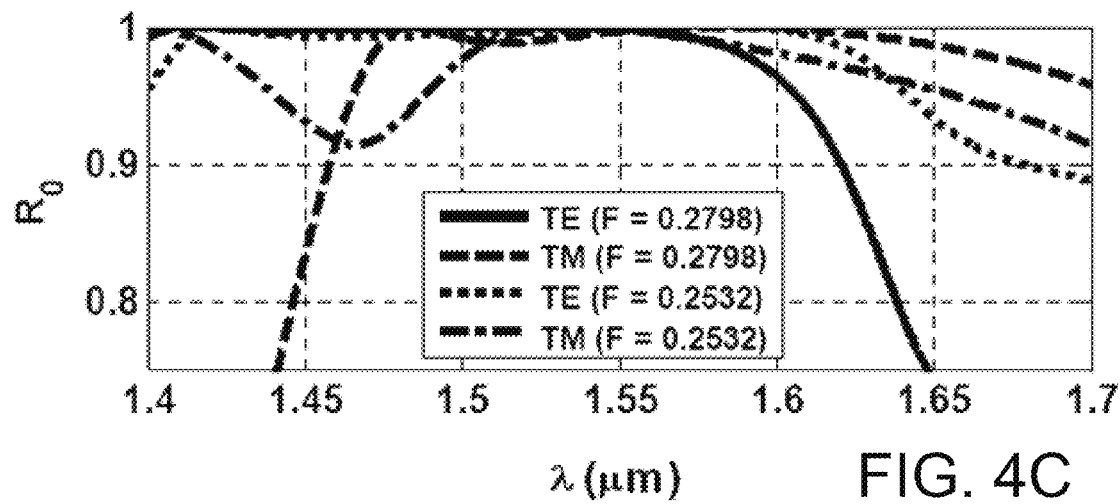
FIGS. 4C-D show the reflectance and spectral phase difference of the retarder design shown in FIG. 1A under ±5.0% deviation in grating fill factor (F of FIG. 1A).
Figure 4D:
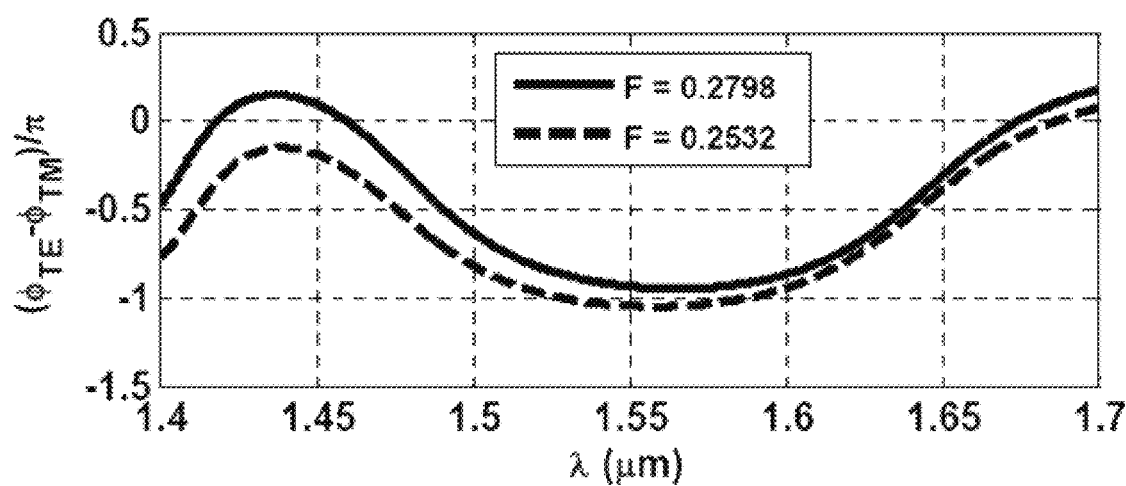

Fabrication of the multilevel devices illustrated in FIGS. 1A and 2A can be accomplished by either deposition of a high-index medium on an appropriate surface-relief pattern etched into the substrate as in FIG. 1A or deposition of the material with highest refractive index on a previously patterned layer on the substrate as in FIG. 2A. Prefabrication analysis of the device's performance relative to parametric deviations is necessary. FIG. 4 provides the reflectance spectra and spectral phase difference of the design in FIG. 1 versus reasonable deviation (±5.0%) in silicon thickness ($d_2$) shown in FIGS. 4A-B and grating fill factor (F) shown in FIGS. 4C-D. As seen in FIGS. 4A-B, the retarder is rather sensitive to deviations in $d_2$. The high-reflectance, flat-band regions shift together in wavelength for both polarizations. As the π-phase-shift band shifts similarly, half-wave operation is achieved approximately across smaller spectral bands. As seen in FIGS. 4C-D, the response versus F deviation is more robust.

Example 4

Figure 5A:
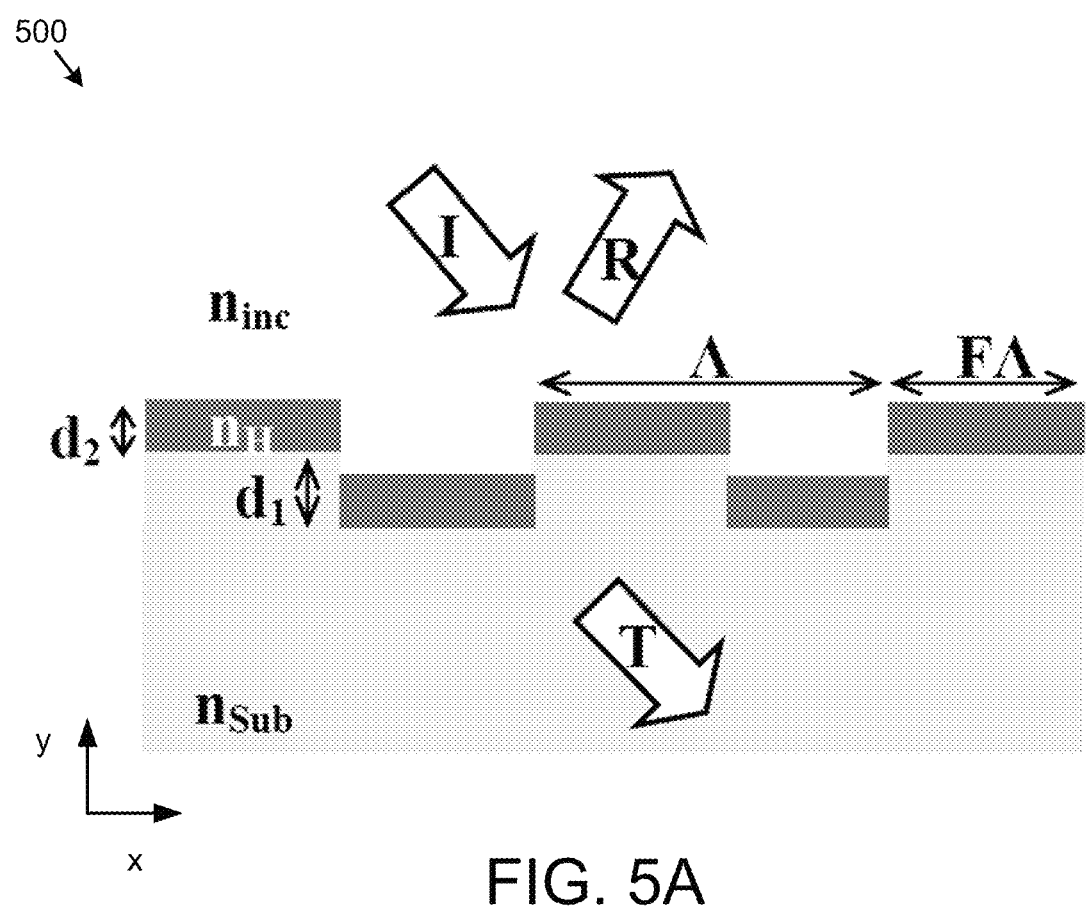
FIG. 5A shows the structure of one of the present silicon-on-insulator (SOI) half-wave retarders designed for operation under oblique incidence; here the angle of incidence is $\theta=45°$.
Figure 5B:
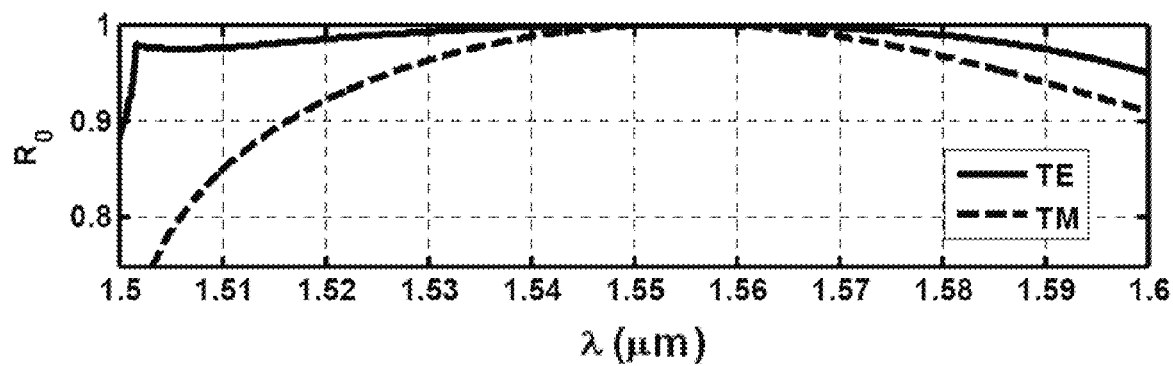
FIG. 5B shows the reflectance of the half-wave retarder shown in FIG. 5A.
Figure 5C:
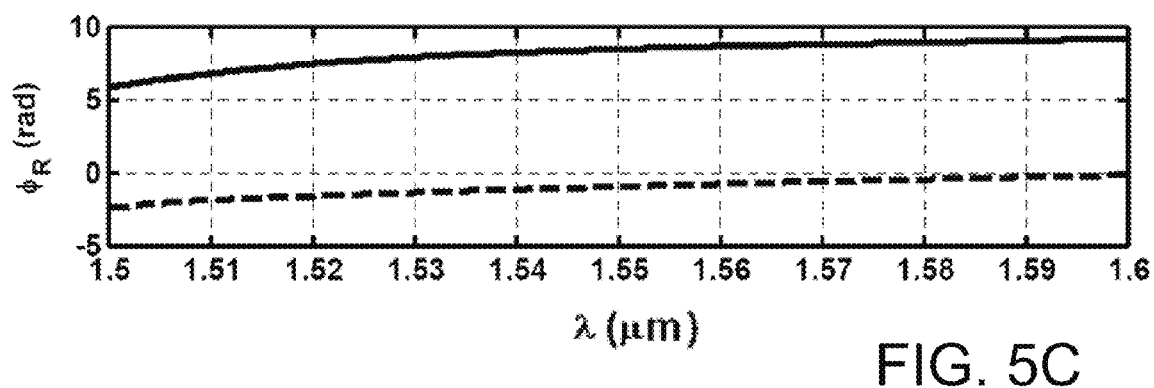
FIG. 5C shows the spectral phase response of the half-wave retarder shown in FIG. 5A for TE and TM polarizations.
Figure 5D:
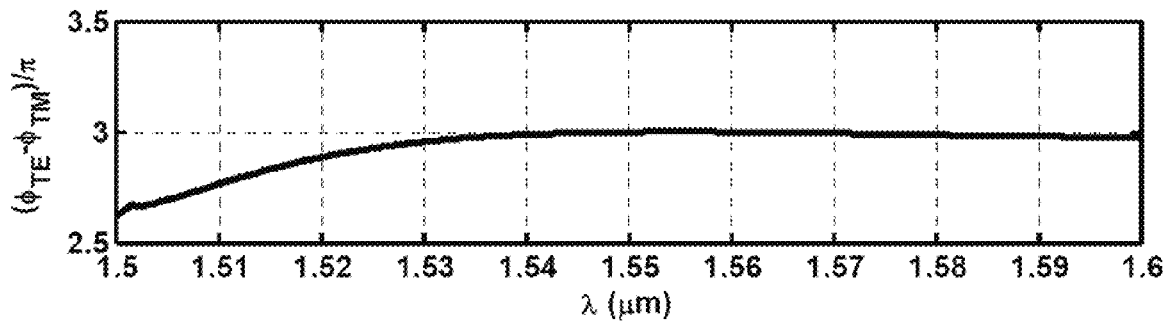
FIG. 5D shows the phase shift between the TE and TM polarizations for the half-wave retarder shown in FIG. 5A.

GMR retarders 500 can be also designed to operate under obliquely incident light. FIGS. 5A-D show the profile, reflectance, phase response, and spectral phase difference of this element under 45° incidence. As seen in FIGS. 5B-D, this device exhibits ~3π (practically π) phase retardance over ~25 nm band with TE and TM reflectance exceeding 0.99 in that band. The parameters for this device are Λ=686.6 nm, F=0.388, $d_1$=844.6 nm, and $d_2$=528.7 nm.

Example 5

Figure 6A:
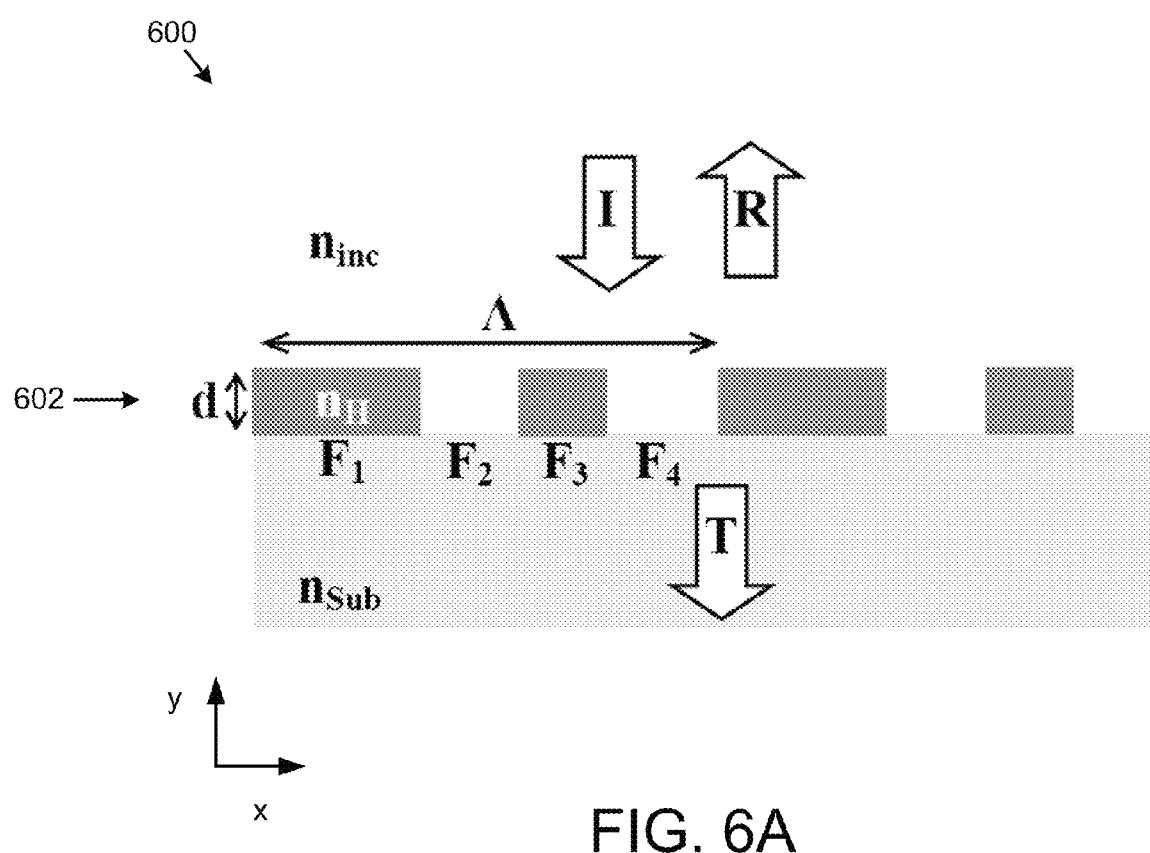
FIG. 6A shows the structure of one of the present single-layer SOI half-wave retarders with a four-part period profile.
Figure 6B:
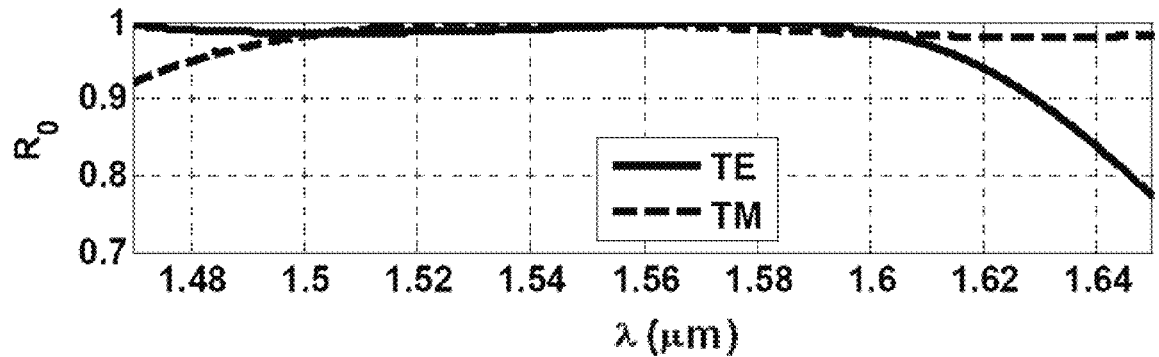
FIG. 6B shows the reflectance of the half-wave retarder shown in FIG. 6A.
Figure 6C:
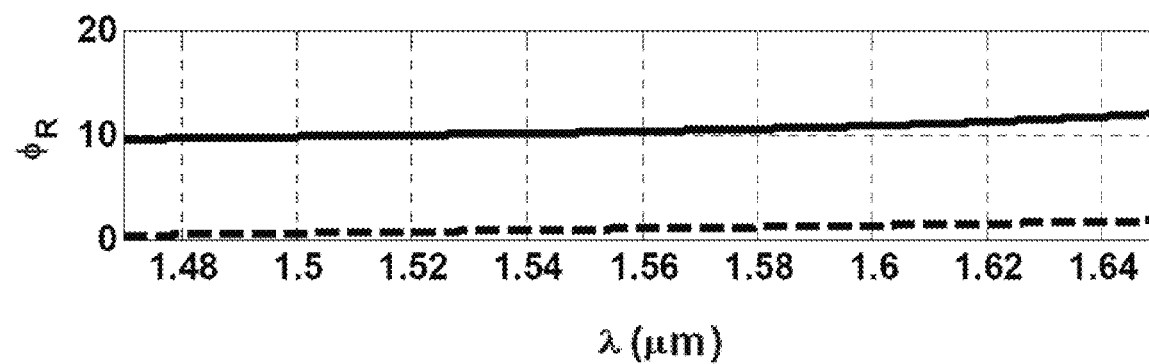
FIG. 6C shows the spectral phase response of the half-wave retarder shown in FIG. 6A for TE and TM polarizations.
Figure 6D:
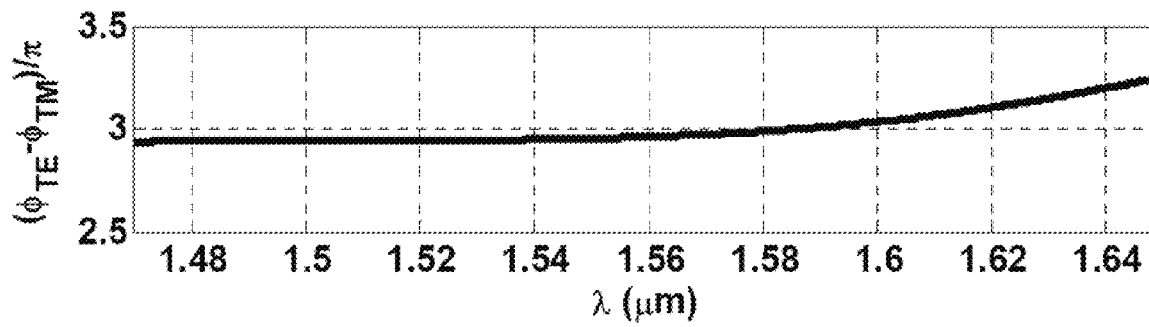
FIG. 6D shows the phase shift between the TE and TM polarizations for the half-wave retarder shown in FIG. 6A.

FIG. 6A illustrates a single-layer silicon-on-insulator (SOI) retarder 600 working in reflection under normal incidence. Again, the incidence and substrate media are assumed to be air ($n_{inc}$=1.0) and silica ($n_{sub}$=1.48), and the grating is silicon ($n_H$=3.48). The period of this device in layer 602 is divided into four parts ($F_1$, $F_2$, $F_3$, $F_4$). This example shows that a single-layer guided-mode resonance element with a complex profile can exhibit specified wideband (~100 nm in this case) amplitude and phase responses. This device has the following structural parameters: Λ=896 nm, d=562.1 nm and [$F_1$, $F_2$, $F_3$, $F_4$]=[0.0770, 0.1670, 0.5800, 0.1760]. FIG. 6A shows the profile of this single-layer element whereas FIGS. 6B-D reveal the reflectance, spectral phase for the TE and TM polarization states and the spectral variation of the resulting phase difference.

Example 6

Figure 7A:
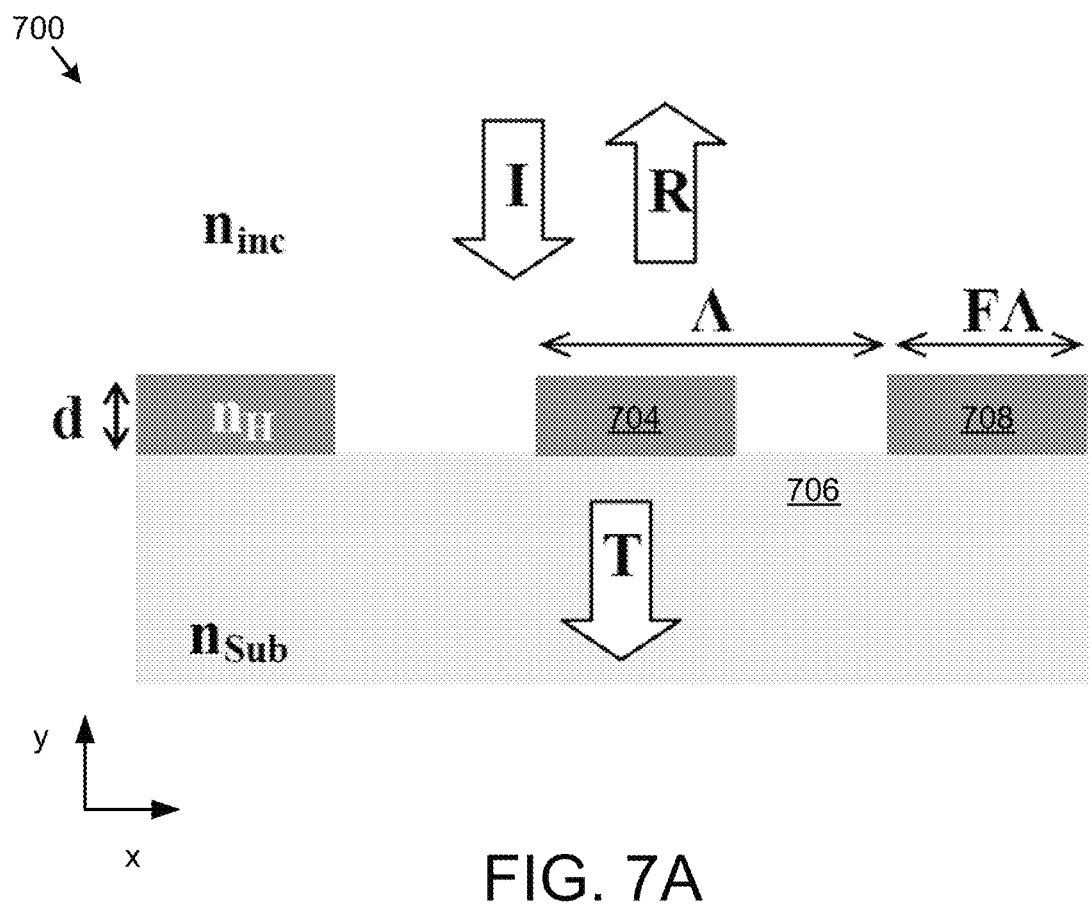
FIG. 7A shows the structure of one of the present transmissive SOI retarders.
Figure 7B:
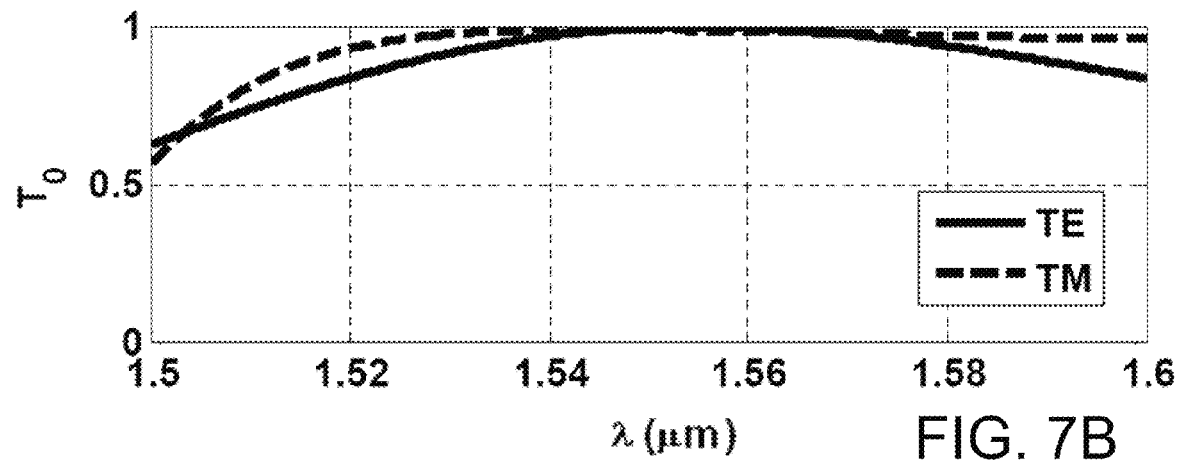
FIG. 7B shows the transmittance of the transmissive SOI retarder shown in FIG. 7A for TE and TM polarizations.
Figure 7C:
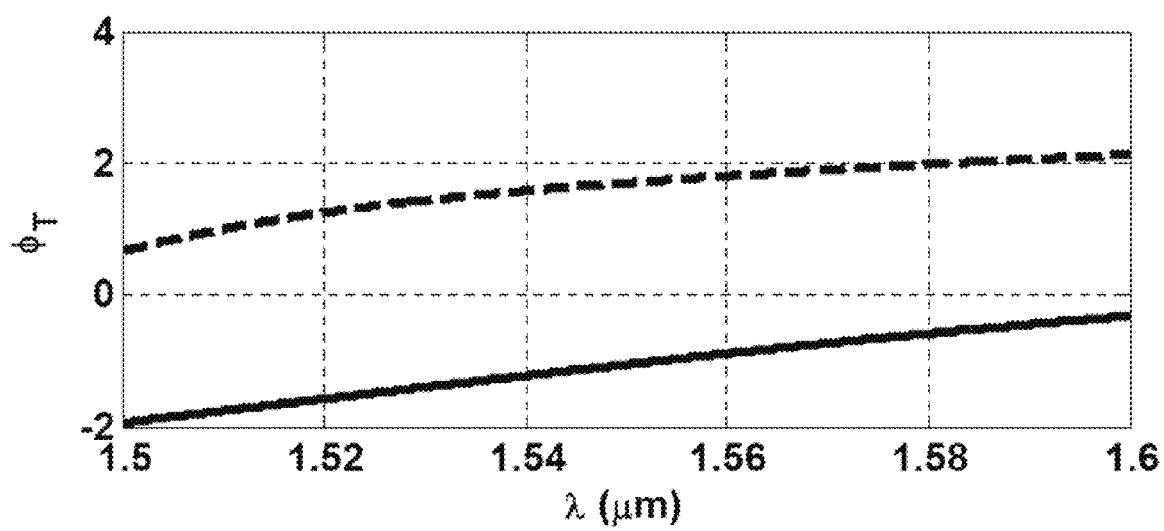
FIG. 7C shows the spectral phase response for the transmissive SOI retarder shown in FIG. 7A for TE and TM polarizations.

GMR retarders 700 can also be implemented to operate in transmission. FIG. 7A shows the profile of such a SOI single-layer element. FIGS. 7B-C show the transmittance ($T_0$) and the phase response for TE and TM polarizations under normal incidence. Parameters of this design are: $\Lambda$=889.8 nm, d=1034.2 nm, and F=0.4033. This element provides ~0.85$\pi$ retardance at 1550 nm, approximating a half-wave retardance.

Example 7

Figure 8A:
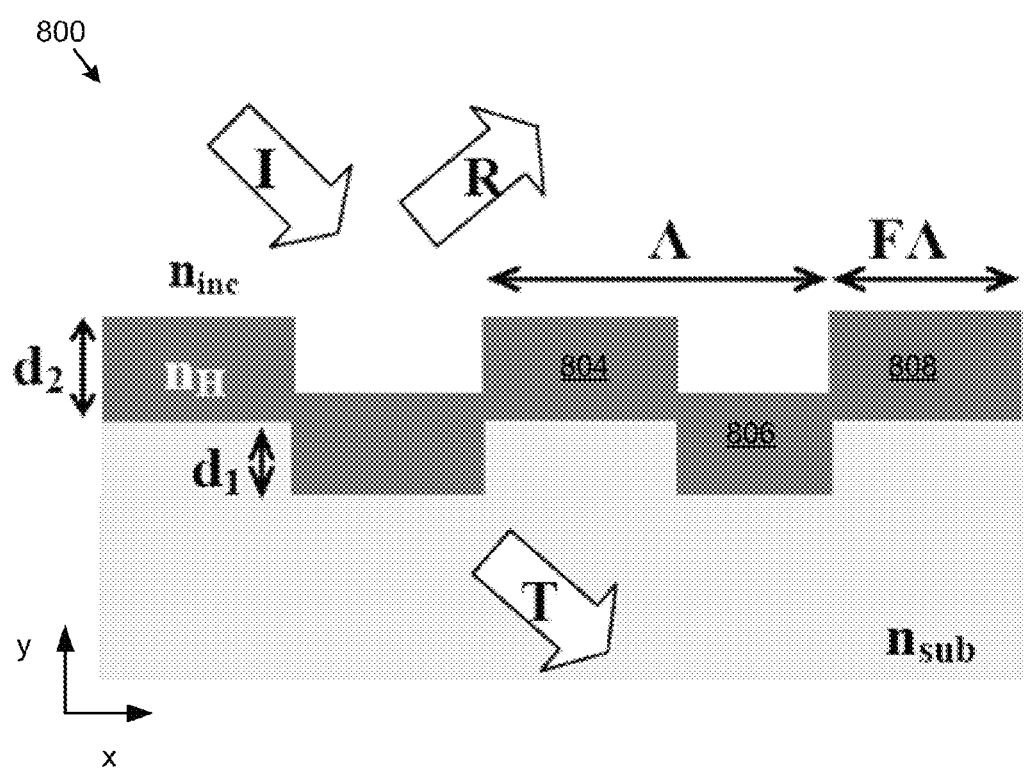
FIG. 8A shows the structure of one of the present silicon-on-insulator (SOI) quarter-wave retarders for operation under oblique incidence; here the angle of incidence is $\theta=45°$.
Figure 8B:
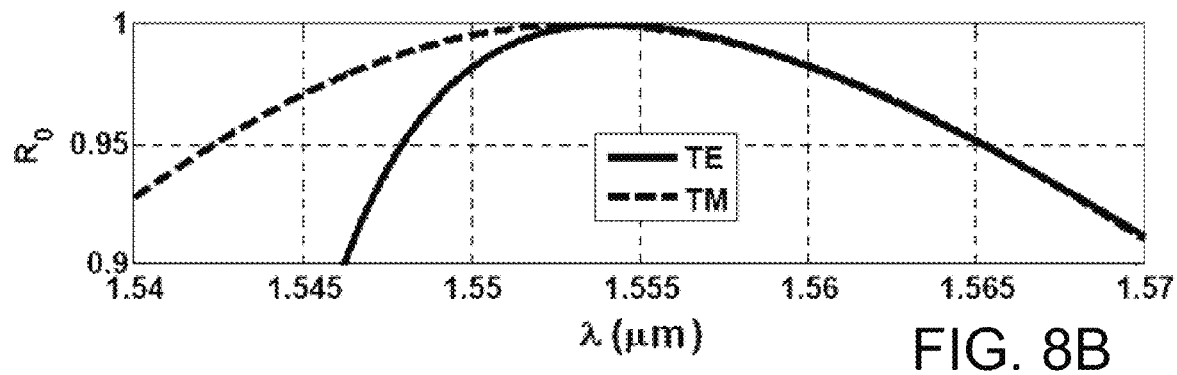
FIG. 8B shows the spectral reflectance response for the quarter-wave retarder shown in FIG. 8A for TE and TM polarizations.
Figure 8C:
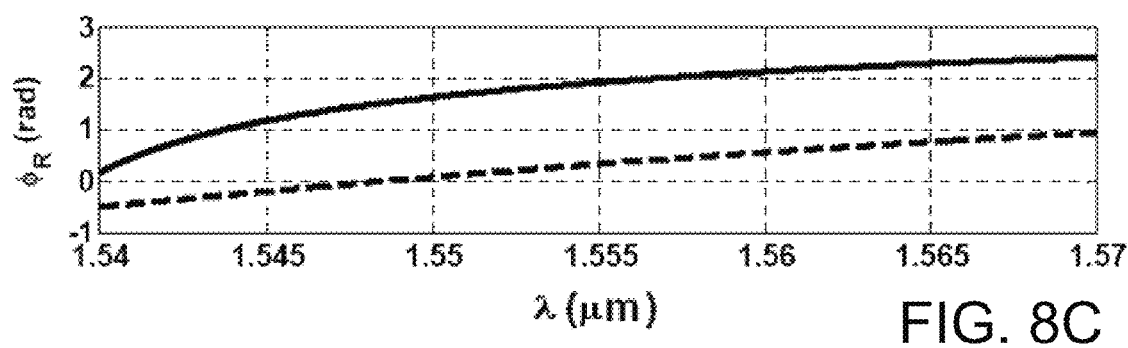
FIG. 8C shows the spectral phase response of the quarter-wave retarder shown in FIG. 8A.
Figure 8D:
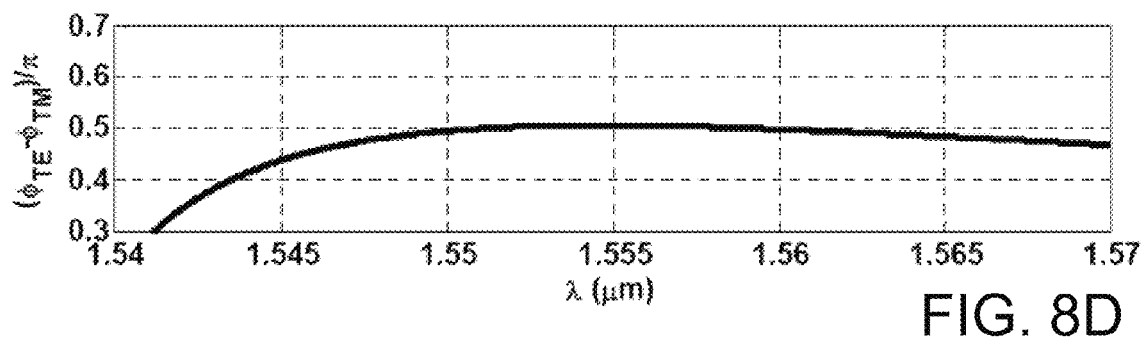
FIG. 8D shows the phase shift between the TE and TM polarizations for the quarter-wave retarder shown in FIG. 8A.

As stated earlier, resonant wave plates can be designed to operate with obliquely incident light. FIG. 8 shows the profile of such a leaky-mode resonant retarder 800 under 45° incidence of light. FIGS. 8B-D show the reflectance, phase response, and spectral phase difference, respectively. This device exhibits ~$\pi/2$ phase retardance over ~10 nm band with TE and TM reflectance exceeding 0.99 in a slightly narrower band that overlaps with the $\pi/2$ phase region as needed. The parameters for this device are $\Lambda$=579.2 nm, F=0.4162, $d_1$=393.2 nm, and $d_2$=1045.2 nm.

Fabrication

Leaky-mode resonance elements can be fabricated using a variety of methods and materials. New methods in fabrication are not needed to fabricate the devices subject to this disclosure. Device patterning can be conducted with conventional photolithography, nanoimprint lithography, electron-beam lithography, and laser holographic interference lithography. Standard etching and thin-film deposition processes are applicable in the fabrication steps. Etching and pattern transfer can be performed using reactive-ion etching RIE (for shallow gratings) and DRIE (deep gratings). Inspection by SEM and AFM can be used for assessment of the processed devices. Optical spectral characterization can be done with tunable lasers, wide-band supercontinuum sources, and matched spectrum analyzers. Fast pulse lasers, wide-bandwidth oscilloscopes, and sensitive detectors can be applicable for testing the devices.

The number of fabrication steps depends on the level of pattern complexity as can be understood for example from FIG. 1. Some devices may be simple to process and some of them may need more processing steps. For example, the device in FIG. 1A, and other similar elements, may be fabricated in some embodiments by first patterning a substrate, in this case made of $SiO_2$, beginning with spinning a resist layer upon the substrate, patterning it in 1D or 2D format by e-beam lithography or by laser interference lithography, developing the resist, and using it as a mask for RIE etching into the substrate to create a corresponding pattern in the $SiO_2$ medium. Subsequently, depositing a conformal layer of Si onto the relief pattern by e-beam evaporation or sputtering, for example, may complete the fabrication. A single-layer GMR device may be fabricated by similar methods; here a high-index layer is deposited on a substrate and then patterned and etched. Inspection by SEM and AFM may be used for verification of the features such as fill factors and layer thicknesses of the processed devices. Verification of the spectral response may be done with tunable lasers, wide-band supercontinuum sources, and matched spectrum analyzers.

Methods

Some embodiments of the present methods are for shifting a polarization between two perpendicular electric-field components of light, and such methods include receiving, at a surface of a leaky-mode resonant retarder, incident light having two perpendicular electric-field components; and shifting, using the leaky-mode resonant retarder, a phase between the two perpendicular electric-field components. The retarders discussed above are examples of retarders that can be used to carry out such methods.

All of the present methods can be practiced without undue experimentation in light of the present disclosure. While the present devices and methods have been described in terms of preferred embodiments, it will be apparent to those of skill in the art that variations may be applied to these devices and methods without departing from the scope of the claims.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A leaky-mode resonant retarder, comprising:
   a substrate; and
   a spatially modulated periodic layer coupled to the substrate, where the spatially modulated periodic layer is spatially modulated in a direction perpendicular to a normal of the substrate and creates a leaky-mode waveguide, and
   where the spatially modulated periodic layer is configured to shift a phase between two perpendicular electric-field components of incident light by a prespecified amount.

2. The leaky-mode resonant retarder of claim 1, where the spatially modulated periodic layer is a first spatially modulated periodic layer and the leaky-mode resonant retarder further comprises a second spatially modulated periodic layer coupled to the first spatially modulated periodic layer.

3. The leaky-mode resonant retarder of claim 1, further comprising a homogenous layer coupled to the spatially modulated periodic layer.

4. The leaky-mode resonant retarder of claim 1, where the spatially modulated periodic layer is configured to shift the phase between the two perpendicular electric-field components by about $\pi/2$ radians.

5. The leaky-mode resonant retarder of claim 1, where the spatially modulated periodic layer is configured to shift the phase between the two perpendicular electric-field components by about $\pi$ radians.

6. The leaky-mode resonant retarder of claim 1, where the leaky-mode resonant retarder is configured to reflect the incident light.

7. The leaky-mode resonant retarder of claim 6, where the leaky-mode resonant retarder is configured to reflect more than 95% of each component of the incident light.

8. The leaky-mode resonant retarder of claim 7, where the leaky-mode resonant retarder is configured to reflect more than 95% of each component of the incident light having a wavelength in the range of 1.5 µm and 1.6 µm.

9. The leaky-mode resonant retarder of claim 1, where the spatially modulated periodic layer is configured to shift the phase between the two perpendicular electric-field components of the incident light and where the incident light is incident on a surface of the leaky-mode resonant retarder at an oblique angle.

10. The leaky-mode resonant retarder of claim 9, where the spatially modulated periodic layer is configured to shift the phase between the two perpendicular electric-field components of incident light and where the incident light is incident on a surface of the leaky-mode resonant retarder at an angle of about 45°.

11. The leaky-mode resonant retarder of claim 1, where the retarder is configured to shift the phase between the two perpendicular electric-field components while transmitting the incident light.

* * * * *